United States Patent
Fitch et al.

(10) Patent No.: US 7,809,622 B1
(45) Date of Patent: Oct. 5, 2010

(54) METHOD AND SYSTEM FOR GENERATING AN EMPLOYMENT METRIC

(75) Inventors: Todd Matthew Fitch, Santa Clara, CA (US); Benjamin R. Weiss, Portola Valley, CA (US); Christopher Friedrich Dolezalek, Menlo Park, CA (US); Thomas A. Frasher, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 212 days.

(21) Appl. No.: 12/060,060

(22) Filed: Mar. 31, 2008

(51) Int. Cl.
*G06Q 40/00* (2006.01)
(52) U.S. Cl. .......................... 705/35; 705/36
(58) Field of Classification Search .............. 705/10–44
See application file for complete search history.

(56) References Cited

U.S. PATENT DOCUMENTS

| | | | |
|---|---|---|---|
| 5,930,764 A * | 7/1999 | Melchione et al. ............ 705/10 |
| 7,421,406 B2 * | 9/2008 | Dixon et al. ............... 705/36 R |
| 7,505,919 B2 * | 3/2009 | Richardson .................... 705/8 |
| 2003/0097342 A1 * | 5/2003 | Whittingtom ................ 705/75 |
| 2004/0064330 A1 * | 4/2004 | Keelan et al. .................. 705/1 |
| 2005/0125259 A1 * | 6/2005 | Annappindi ................... 705/4 |
| 2005/0182646 A1 * | 8/2005 | Gilmore ........................ 705/1 |

\* cited by examiner

*Primary Examiner*—Frantzy Poinvil
(74) *Attorney, Agent, or Firm*—Osha • Liang LLP (57) ABSTRACT

A method for generating an employment metric involves obtaining employer payroll data from multiple business applications and obtaining personal income data from multiple financial management applications, where personal income data indicate at least one income source absent from employer payroll data. The method further involves aggregating employer payroll data and personal income data to obtain aggregated employment data, and generating the employment metric using aggregated employment data.

24 Claims, 5 Drawing Sheets

METHOD AND SYSTEM FOR GENERATING AN EMPLOYMENT METRIC

BACKGROUND

Because economies (for example, regional economies, national economies, global economies, and cross-sections thereof) can be very complicated, economists tend to be interested in generating economic indicators that help quantify and/or predict behaviors of the economies. Employment is one such economic indicator. Employment is typically measured as the percentage of the eligible workforce seeking employment that is actually employed. Employment is often measured by its opposite, unemployment, meaning the percentage of the eligible workforce seeking employment that is not actually employed.

High unemployment may indicate a struggling economy, and low unemployment may indicate a thriving economy. However, because the unemployment rate is based on eligible workers who are seeking employment, if fewer workers are seeking employment, it is possible for an economy to lose jobs even as unemployment decreases. Further, an individual worker may be employed in two or more positions. For example, the worker may have a full-time job and a part-time job, two full-time jobs, two part-time jobs, etc.

Employment statistics may be determined in one or more of the following ways. First, employment surveys may be issued to eligible workers, and the workers' replies may be used to determine the current unemployment rate. For example, in the United States of America (US), the US Census Bureau routinely issues surveys to samples of the population to determine information including, but not limited to, employment statistics. The accuracy of statistics derived from such surveys is highly dependent on the representative quality of the surveys and the accuracy of the workers' replies. Workers do not always truthfully report their employment status, especially if they have untaxed sources of income.

Second, employment statistics may be determined based on workers' claims for unemployment benefits. Typically, a change in claims from one month to the next is considered indicative of the directional growth of the employment market. For example, if more people claim unemployment in March than in February, unemployment may be rising. However, if a worker stops claiming unemployment, this method cannot determine whether the worker has found work or has simply given up looking for work. Thus, especially in long-term employment shortages, decreasing unemployment claims may not accurately reflect an increase in the employment market.

Third, employers may periodically report the number of employees on its payrolls. When the payroll numbers from multiple employers are combined, a change in total payroll numbers from one month to the next may indicate an increase or decrease in total employment. However, as noted above, workers may receive untaxed sources of income. Thus, a worker may leave a business and continue earning income without being counted in any official payroll numbers.

In some cases, employment/unemployment statistics are based on a combination of one or more of the factors described above. For example, a local, state, or national government may examine the aforementioned factors and issue a reasoned estimate of the current unemployment rate. Such estimates are often revised upward or downward as new information becomes available.

SUMMARY

In general, in one aspect, the invention relates to a method for generating an employment metric. The method comprises obtaining employer payroll data from a plurality of business applications, obtaining personal income data from a plurality of financial management applications, wherein personal income data indicate at least one income source absent from employer payroll data, aggregating employer payroll data and personal income data to obtain aggregated employment data, and generating the employment metric using aggregated employment data.

In general, in one aspect, the invention relates to a system for generating an employment metric. The system comprises an aggregate data repository configured to store aggregated employment data, wherein aggregated employment data comprises employer payroll data from a plurality of business applications, wherein aggregated employment data further comprises personal income data from a plurality of financial management applications, and wherein personal income data indicate at least one income source absent from employer payroll data. The system further comprises a data processing service operatively connected to the aggregate data repository and configured to generate the employment metric using aggregated employment data.

In general, in one aspect, the invention relates to a computer readable medium comprising executable instructions for generating an employment metric. The executable instructions comprise instructions to obtain employer payroll data from a plurality of business applications, obtain personal income data from a plurality of financial management applications, wherein personal income data indicate at least one income source absent from employer payroll data, aggregate employer payroll data and personal income data to obtain aggregated employment data, and generate the employment metric using aggregated employment data.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating an employment metric. Employer payroll data are obtained from multiple business applications, and personal income data are obtained from multiple financial management applications. In one or more embodiments of the invention, the personal income data indicate one or more income sources that are absent from the employer payroll data. The employer payroll data and personal income data are aggregated, and the aggregated data are used to generate the employment metric.

Figure 1:
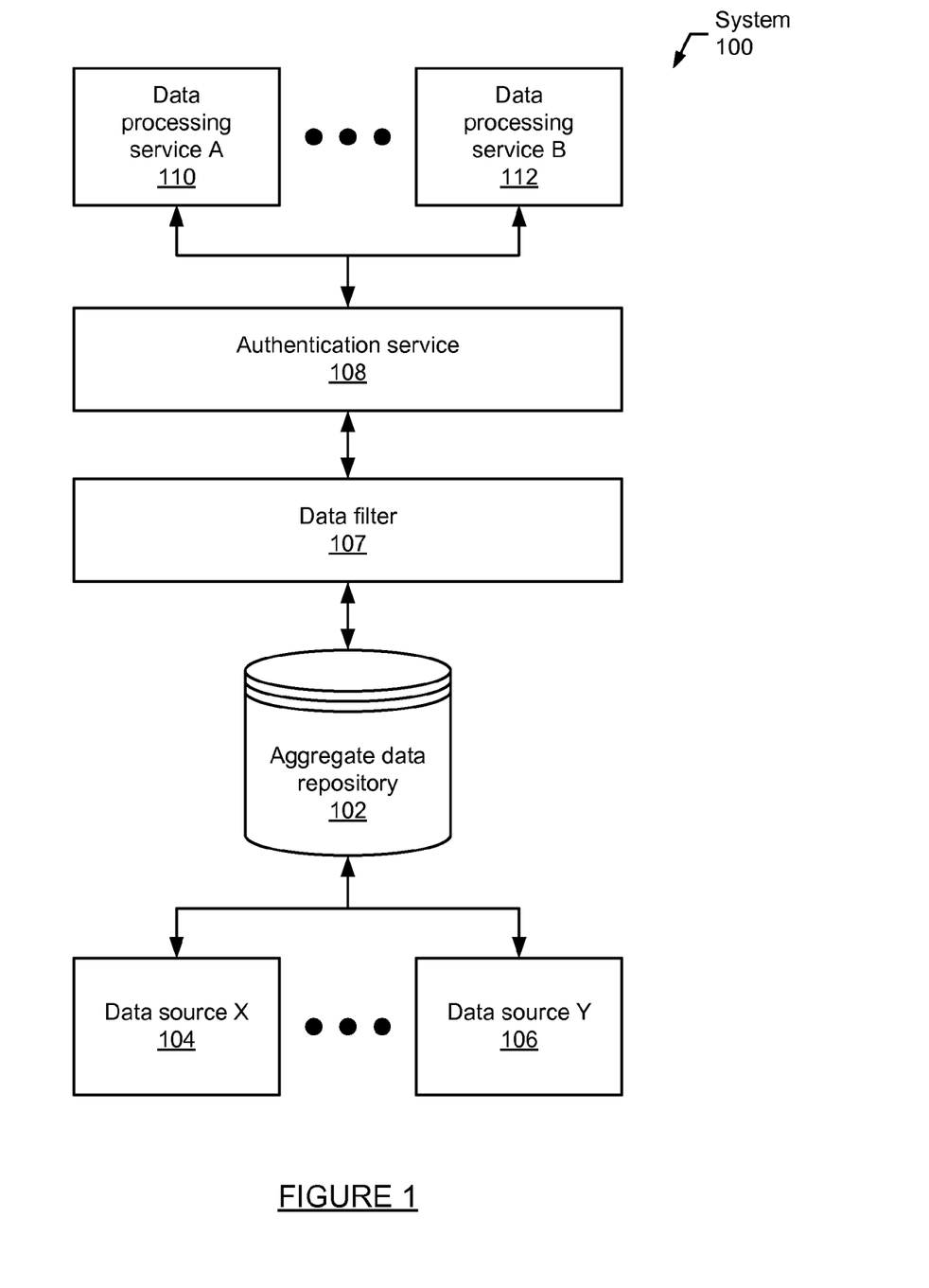
FIGS. 1-2 show diagrams of systems in accordance with one or more embodiments of the invention.

FIG. 1 shows a diagram of a system (100) in accordance with one or more embodiments of the invention. The system (100) includes multiple data sources (e.g., data source X (104), data source Y (106)) configured to provide data to an aggregate data repository (102). The aggregate data repository (102) is referred to as "aggregate" because it is configured to store aggregated data from the data sources. For the purposes of this discussion, "aggregated" means "grouped together." For example, if the aggregate data repository (102) is a database, data from the data sources may be grouped together in one or more tables of the database. Alternatively, aggregated data may be grouped together as cells in a spreadsheet, fields of an extensible markup language (XML) document, or in any other aggregated format. Those skilled in the art will appreciate that data may be stored and aggregated in many different ways.

In one or more embodiments of the invention, the data sources include one or more financial management applications (used to manage income, expenditures, taxes, and/or any other type of financial data) for a government entity, business, family, or individual. Further, the data sources may include one or more business applications. Business applications are software products that provide functionality for managing business operations. A financial management application for a business is one example of a business application. Other examples of business applications include payroll applications, customer relationship management (CRM) applications, shopping cart applications (for example, associated with the backend of a shopping website), inventory tracking applications, supply chain management applications, project management applications, production management application (for example, associated with large object manufacturing and/or large quantity manufacturing), or any other type of business application configured to provide data relating to business operations. Many different types of data sources may be used.

In one or more embodiments of the invention, data obtained from the data sources include employer payroll data from business applications. Specifically, in one or more embodiments of the invention, the employer payroll data identify the number of employees of different businesses. The employer payroll data may also include additional information about each employee, such as salary, duration of employment, benefits information (for example, health benefits), and/or any other type of information typically stored by employers about their employees. In one or more embodiments of the invention, each employee is identified in the employer payroll data by a unique identifier, such as a social security number, employee number, or any other type of identifier suitable for distinguishing between different employees. To help protect sensitive and/or private data, unique identifiers may be chosen that are not traceable back to specific employees.

Further, in one or more embodiments of the invention, data obtained from the data sources include personal income data from financial management applications. Specifically, one or more of the financial management applications may be used to track individual and/or family income and expenses over time (e.g., using electronic bank records and/or manual entries based on purchase receipts). In one or more embodiments of the invention, entries in the financial management applications include income (i.e., gains in financial assets). For example, the entries may list deposits of paychecks and/or other types of deposits into financial accounts. Thus, personal income data may be obtained from those entries.

Further, data transmitted to the aggregate data repository (102) may include demographic information about businesses, such as name, location, industry, annual revenues, or any other type of demographic information about the businesses. Demographic information about businesses may be used to filter aggregated data, as described below.

Further, data transmitted to the aggregate data repository may include information about individuals, businesses, and/or families, such as name, age, gender, ethnicity, occupation, annual household income, or any other type of demographic information about the individuals and/or families. Demographic information about the individuals and/or families may be used to filter aggregated data, as described below.

Further, in one or more embodiments, the system (100) includes one or more data processing services (e.g., data processing service A (110), data processing service B (112)). In one or more embodiments, the data processing services are configured to generate one or more economic indicators or other types of business and/or finance metrics based on data stored in the aggregate data repository (102). Specifically, in one or more embodiments of the invention, one or more of the data processing services are configured to generate an economic indicator or other type of metric using one or more methods described in detail below. For example, a data processing service may be configured to generate an employment metric using aggregated employer payroll data and personal income data.

In view of the above, in one or more embodiments, the data sources may be thought of as input services for the aggregate date repository (102), because the data sources are used to input data to the aggregate data repository (102). Further, in one or more embodiments, the data processing services may be thought of as output services for the aggregate data repository (102), because the data processing services generate output based on the data in the aggregate data repository (102). Specifically, the data processing services generate output in the form of economic indicators and/or other types of metrics, and may also be configured to generate other types of output based on data from the aggregate data repository (102). In one or more embodiments, the aggregate data repository (102) is communicatively coupled with application programming interfaces (APIs) (not shown) that allow input services and/or output services to interact with the aggregate data repository (102).

In one or more embodiments of the invention, access to the aggregate data repository (102) is restricted using an authentication service (108). Specifically, the authentication service (108) is configured to ensure that only authorized data processing services are given access to the aggregate data repository (102). For example, the authentication service (108) may require a data processing service to present a username and/or password, an encrypted digital signature, or any other type of authorization credential recognized as valid by the authentication service (108). In one or more embodiments, the aggregate data repository (102) is located in a local area network (LAN) and the authentication service (108) includes a firewall protecting the LAN from unauthorized access.

Further, the system (100) may include a data filter (107) configured to filter data provided to the data processing services. In one or more embodiments of the invention, filtering the data allows for economic indictors and/or other types of metrics to be customized for different demographics. For example, the data may be filtered based on information about consumers, such as age, gender, location, and annual income. The data may also be filtered based on information about businesses, such as location or industry. Many different types of filtering criteria may be used. In one or more embodiments of the invention, individual data processing services are authorized to access only a subset of the data in the aggregate data repository (102), and the data filter (107) is configured to enforce the subsets available to the data processing services. In one or more embodiments of the invention, if a data processing service has access to only a subset of the data, any data outside that subset are completely hidden from the data processing service.

Figure 2:
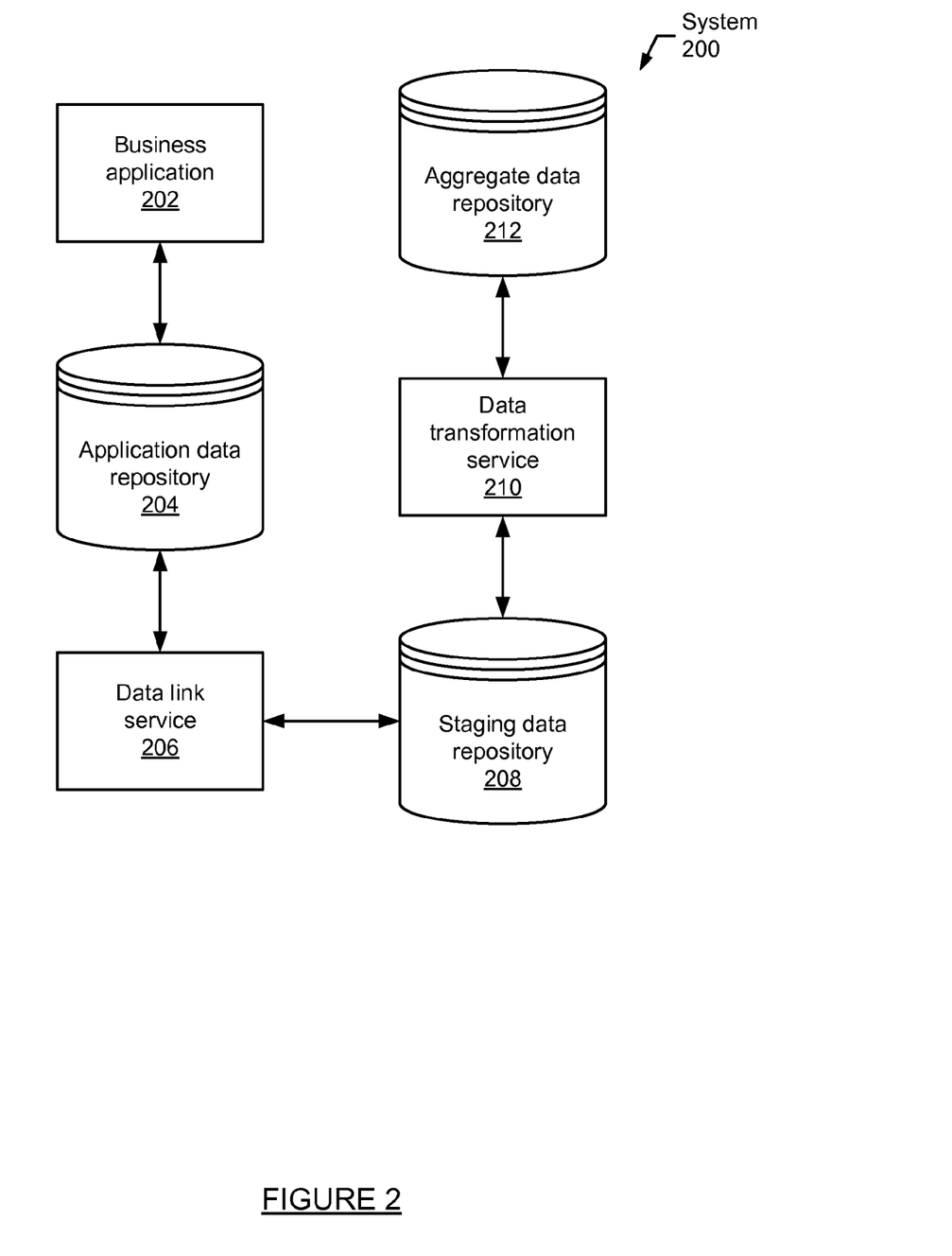

As discussed above, the data sources diagrammed in FIG. 1 may include one or more financial management applications. FIG. 2 shows a diagram of a system (200) that includes a financial management application (202) in accordance with one or more embodiments of the invention. The financial management application (202) may be a financial management application used by a government entity, a business, a family, or an individual. In one or more embodiments of the invention, a similar diagram may be envisioned that replaces the financial management application (202) with a business application, where data stored by the business application include payroll data about employees.

In one or more embodiments of the invention, data from the financial management application (202) are stored in an application data repository (204). The application data repository (204) may be a database, an XML document, a spreadsheet, a text file, or any other type of repository configured to store data associated with the financial management application (202). In one or more embodiments of the invention, data stored in the application data repository (204) include information about individual and/or family income, such as income from paychecks and/or other types of financial gains. Moreover, the application data repository (204) may be configured to store demographic information about the government entity, business, family, or individual using the financial management application (202).

In one or more embodiments of the invention, before data from the application data repository (204) are transmitted to an aggregated data repository (212), the data are transformed to a format compatible with the aggregate data repository (212). As one example, if the aggregate data repository (212) is a database, the data may require normalization to conform with a database schema used by the aggregate data repository (212). As another example, the data may require transformation to a particular XML format. Many different types of data transformation may be required, depending on the implementations of the application data repository (204) and the aggregate data repository (212).

In one or more embodiments of the invention, to transform the data to a compatible format, the data are transmitted to a staging data repository (208) using a data link service (206). In one or more embodiments, the data link service (206) is a module or plug-in of the financial management application (202). Alternatively, the data link service (206) may be independent of the financial management application (202). In either case, the data link service (206) is configured to retrieve data from the application data repository (204) and transmit the data (for example, over a file system and/or network) to the staging data repository (208).

Further, in one or more embodiments, the data link service (206) is configured to retrieve only a subset of the data available in the application data repository (204). For example, if the application data repository (204) is configured to store an individual's financial data, the data link service (206) may omit data that uniquely identify the individual, such as a credit card number, a social security number, a street address, a phone number, or any other type of personally identifying data. Alternatively, personally identifying data may be transmitted to the aggregate data repository (212), and privacy of the data may be enforced by another component of the system (200), such as an authentication service (not shown) communicatively coupled with the aggregate data repository (212).

In one or more embodiments of the invention, once the data are stored in the staging data repository (208), the data are transformed to the required format by a data transformation service (210). The transformed data are then transmitted to the aggregate data repository (212). Data stored in the aggregate data repository (212) may then be used to generate an economic indicator, as discussed herein.

While the system (200) shown in FIG. 2 includes several different components, embodiments of the invention may be envisioned that omit one or more of these components. For example, in one or more embodiments, the data link service (206) is configured to transmit data directly to the data transformation service (210). In such cases, use of the staging data repository (208) may not be required. Further, the financial management application (202) may be configured to generate data in a format that is already compatible with the aggregate data repository (212). In such cases, use of the data transformation service (210) may not be required.

Moreover, the financial management application (202) may be configured to store data directly in the aggregate data repository (212). For example, the financial management application (202) may be a web-based application configured to use the aggregate data repository (212) for data storage. In such cases, the application data repository (204) and data link service (206) may not be required. Alternatively, the system (200) may be logically separated into client-side and server-side components. For example, the financial management application (202), application data repository (204), and/or data link service (206) may be executing on an end-user's computer system, and the staging data repository (208), data transformation service (210), and/or aggregate data repository (212) may be executing on one or more other computer systems separated from the end-user's computer system by a network.

Many different embodiments of the system (200) may be envisioned that remain within the scope of the invention. Further, while the system (200) is described with respect to a financial management application (202), a similar system may be envisioned that uses other types of application software.

Figure 3:
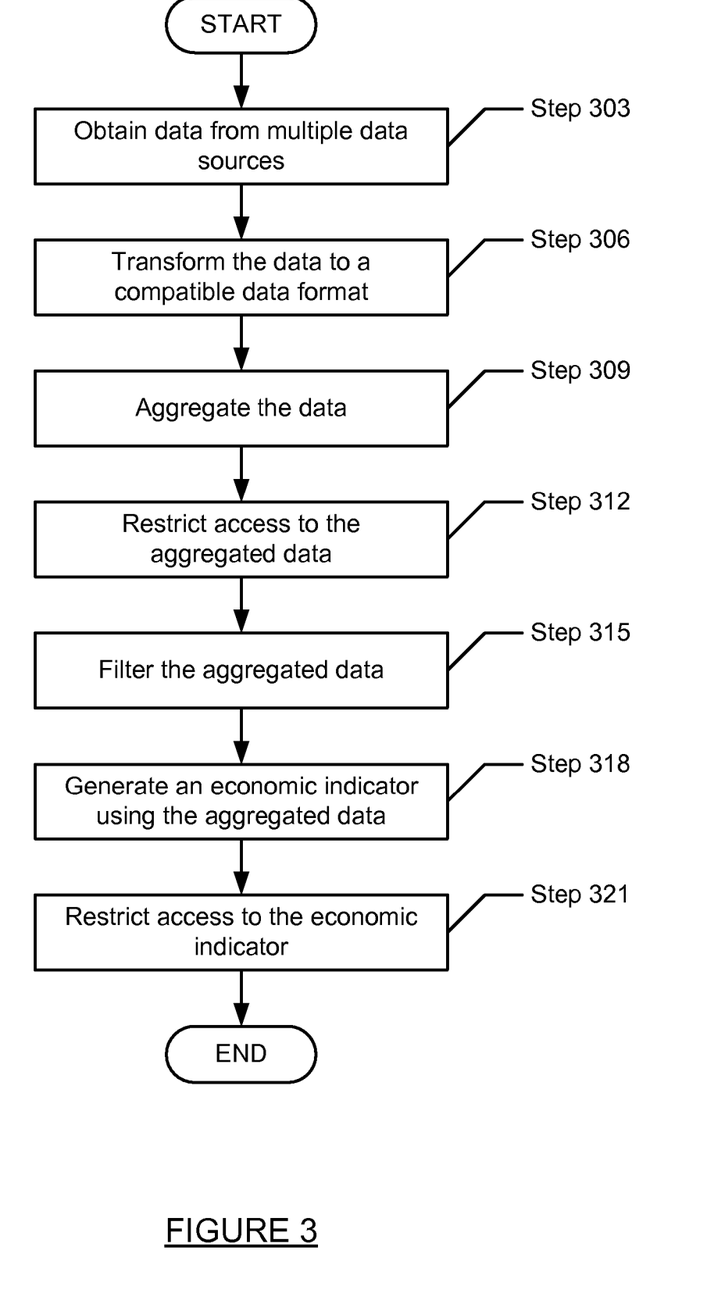
FIG. 3 shows a flowchart of a method for aggregating data in accordance with one or more embodiments of the invention.

FIG. 3 shows a flowchart of a method for aggregating data in accordance with one or more embodiments of the invention. In one or more embodiments of the invention, one or more of the steps shown in FIG. 3 may be omitted, repeated, and/or performed in a different order than the order shown in FIG. 3. Accordingly, embodiments of the invention should not be considered limited to the specific arrangement of steps shown in FIG. 3.

In one or more embodiments of the invention, in Step 303, data are obtained from multiple data sources. As discussed above, the data sources may include financial management applications for managing government, business, family, and/ or individual finances. Further, the data sources may include one or more business applications such as payroll applications, CRM applications, shopping cart applications, inventory tracking applications, supply chain management applications, project management applications, production management application (for example, associated with large object manufacturing and/or large quantity manufacturing), or any other type of business application configured to provide data relating to business operations. In one or more embodiments of the invention, the data obtained from the data sources include employer payroll data from business applications and personal income data from financial management applications.

In one or more embodiments of the invention, in Step 306, the data are transformed to a data format that is compatible with an aggregate data repository. For example, as discussed above, the data may be transformed to satisfy a particular database schema or XML format. Further, as discussed above, the data may be transformed using a data transformation service communicatively coupled with the aggregate data repository. In general, in one or more embodiments of the invention, transforming the data allows for data from multiple types of data sources to be aggregated in the aggregate data repository.

In one or more embodiments of the invention, in Step 309, the data are aggregated. As noted above, "aggregating" means "grouping together." For example, data may be grouped in one or more tables of the database, cells in a spreadsheet, fields of an XML document, or in any other aggregated format. In one or more embodiments of the invention, aggregating the data helps facilitate generating an economic indicator and/or other type of metric based on data from multiple data sources.

In one or more embodiments of the invention, in Step 312, access to the aggregated data is restricted. Restricting access to the aggregated data involves ensuring that the aggregated data is only accessible to authorized entities (for example, businesses, individuals, and/or government entities. For example, access may be restricted by enforcing a username and/or password, an encrypted digital signature, or any other type of authorization credential. Further, access may be restricted based on a location of the aggregate data repository in a network. For example, the aggregate data repository may be located in a local area network (LAN) and access may be restricted using a firewall that protects the LAN from unauthorized access.

Further, in one or more embodiments of the invention, access to the aggregated data is restricted based on whether an entity has purchased access to the aggregated data. In other words, access to the aggregated data may be sold and non-paying entities may be restricted from accessing the aggregated data. For example, an entity may purchase access to query (using Structured Query Language (SQL), a report interface, or any other appropriate query mechanism) the aggregated data or a subset thereof. In one or more embodiments of the invention, access to the aggregated data is sold using a subscription model, where the entity purchases access for a limited time period or with recurring fees.

Alternatively, a copy of the aggregated data (or a subset thereof) may be provided to the entity in an electronic storage medium. As one example, aggregated data may be packaged in an electronic file and transmitted to the entity via File Transfer Protocol (FTP), email, or any other type of electronic transmission. As another example, a data set including the aggregated data (or a subset thereof) may be written to a portable storage medium, such as a compact disc (CD), digital video disc (DVD), flash drive, or any other type of portable storage medium given to the purchasing entity. Many different purchase and delivery models may be used to provide restricted access to the aggregated data. In one or more embodiments of the invention, the price of access is proportional to the amount of access granted. For example, access to query all of the aggregated data may cost more than access to query a subset of the aggregated data (for example, for a particular demographic population).

In one or more embodiments of the invention, in Step 315, the aggregated data are filtered. As discussed above, filtering the data may allow for economic indicators and/or other types of metrics to be customized for different demographics. For example, the data may be filtered based on information consumers, such as age, gender, location, and annual income. The data may also be filtered based on information about businesses, such as location or industry. Many different types of filtering criteria may be used. Further, the aggregated data may effectively be filtered retrospectively. In other words, because the aggregate data repository may include a variety of demographic data, different filtering criteria may be applied at different times. In one or more embodiments of the invention, restricting access to the aggregated data (Step 312) also involves a type of filtering, by limiting access to a particular subset of the aggregated data.

In one or more embodiments of the invention, in Step 318, an economic indicator is generated using the aggregated data. Many different types of economic indicators exist. In one or more embodiments of the invention, the aggregated data include employer payroll data and personal income data. Further, the economic indicator may be generated based on the employer payroll data and personal income data. Specifically, generating the economic indicator may involve one or more steps shown in FIGS. 4A-4B, discussed in detail below. In one or more embodiments of the invention, if an entity purchases access to the aggregated data (or an entity thereof), the economic indicator is generated by the purchasing entity using the aggregated data. Alternatively, the economic indicator may be generated by the same entity that controls the aggregate data repository.

In one or more embodiments of the invention, in Step 321, access to the economic indicator is restricted. In one or more embodiments of the invention, restricting access to the economic indicator involves using a username and/or password, an encrypted digital signature, network-based security, two or more factor authentication, or any other type of access control. Further, in one or more embodiments of the invention, access to the economic indicator is based on whether an entity has paid for access to the economic indicator. In other words, access to the economic indicator may be sold and non-paying entities may be restricted from accessing the economic indicator. For example, an entity may purchase access to a one-time or periodical report (for example, a newsletter) that includes the economic indicator.

The report may be distributed by email, paper copy, portable storage medium, FTP, restricted webpage, or any other physical or electronic distribution medium. In one or more embodiments of the invention, the entity is granted access to an electronic interface that allows the entity (or a representative thereof) to run the report on demand. Alternatively, reports may be generated by the same entity that controls the aggregate data repository. The report interface may also include controls to filter the aggregated data used to generate the economic indicator (Step 315).

In one or more embodiments of the invention, the specific filtering criteria used are based on requests by purchasing entities. Thus, the reports may effectively be customized for the purchasing entities. Many different purchase and delivery models may be used to provide restricted access to the economic indicator. In one or more embodiments of the invention, the price of access is proportional to the amount of access granted. For example, access to economic indicators for an entire country may cost more than access to an economic indicator for an individual town or county.

Figure 4A:
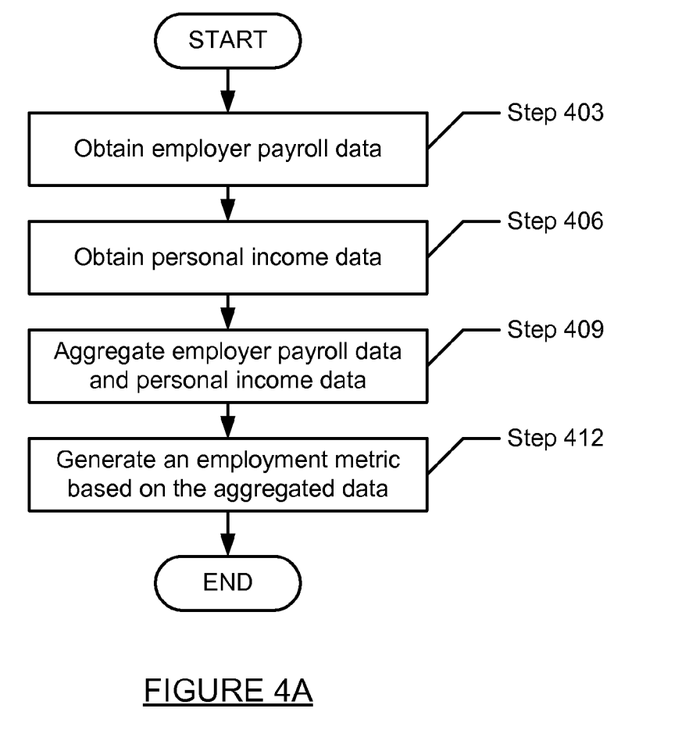
FIGS. 4A-4B show flowcharts of a method for generating an employment metric in accordance with one or more embodiments of the invention.
Figure 4B:
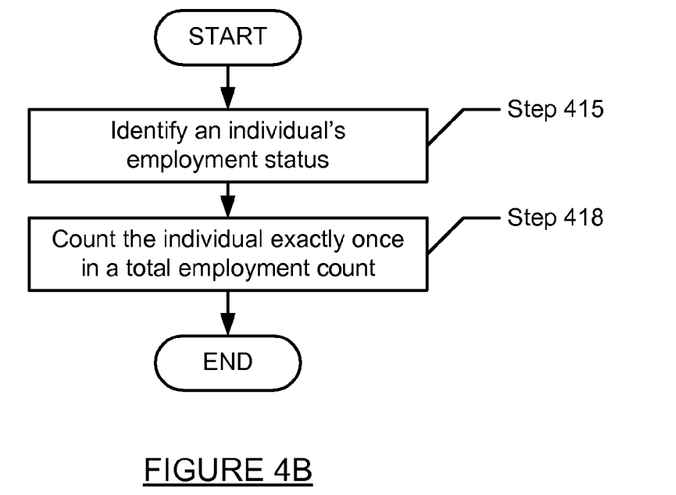

FIGS. 4A-4B show flowcharts of a method for generating an economic indicator in accordance with one or more embodiments of the invention. In one or more embodiments of the invention, one or more of the steps shown in FIGS. 4A-4B may be omitted, repeated, and/or performed in a different order than the order shown in FIGS. 4A-4B. Accordingly, embodiments of the invention should not be considered limited to the specific arrangement of steps shown in FIGS. 4A-4B.

Beginning with discussion of FIG. 4A, in one or more embodiments of the invention, in Step 403, employer payroll data are obtained. As discussed above, the employer payroll data identify the number of employees of different businesses. The employer payroll data may also include additional information about each employee, such as salary, duration of employment, benefits information (for example, health benefits), and/or any other type of information typically stored by employers about their employees. In one or more embodiments of the invention, each employee is identified in the employer payroll data by a unique identifier, such as a social security number, employee number, or any other type of identifier suitable for distinguishing between different employees. To help protect sensitive and/or private data, unique identifiers may be chosen that are not traceable back to specific employees.

Further, in one or more embodiments of the invention, in Step 406, personal income data are obtained. As discussed above, the personal income data identify income sources such as paychecks and other types of financial gains. For example, profits from online sales of products (for example, using EBay, Craigslist, the Global E-Commerce Mega Marketplace (GEMM), or any other similar type of electronic storefront), hosting a website, day trading investments, or any other type of profit-generating activity, may be considered income for the purposes of this discussion. Those skilled in the art will appreciate that online sales via one or more of the aforementioned electronic storefronts or other profit-generating activity may not be included in the employer payroll data. Accordingly, in one or more embodiments of the invention, the personal income data include information about "off-the-books" sources of income that would not be counted in employment statistics using traditional methods.

In one or more embodiments of the invention, in Step 409, the employer payroll data and the personal income data are aggregated. Specifically, the employer payroll data and the personal income data may be aggregated using a system and/or method described above. In one or more embodiments of the invention, aggregating the employer payroll data and the personal income data allows for all income sources (i.e., official income sources and off-the-books income sources) to be considered collectively.

In one or more embodiments of the invention, in Step 412, the employment metric is generated based on the aggregated data. Many different types of employment metrics may be generated. As one example, the aggregated data may be used to estimate an unemployment rate (or, conversely, an employment rate). As another example, the aggregated data may be used to compare official income (i.e., income reported by employers) with off-the-books income. Such information may be useful, for example, to estimate tax revenues lost to off-the-books income.

Further, as noted above, the aggregated data may be filtered according to demographic criteria. Accordingly, the employment metric may be specific to one or more demographic criteria. For example, the employment metric may relate to employment in a specific industry or income bracket. Further, the employment metric may relate to worker demographics, such as age, sex, location, or marital status. The aggregated data may be filtered in many different ways to generate a customized employment metric.

Turning to discussion of FIG. 4B, as noted above, the employment metric may identify an employment/unemployment rate. To that end, in one or more embodiments of the invention, in Step 415, an employment status is identified for each worker represented in the aggregated data. As noted above, a worker may receive income from an official source and/or an off-the-books source. If the worker does not recieve income from an off-the-books source, traditional methods of determining the unemployment rate would count the worker as unemployed. However, in one or more embodiments of the invention, because personal income data identifies off-the-books income sources, the worker may be counted as employed instead.

In one or more embodiments of the invention, in Step 418, having identified that the worker receives an official income source and/or an off-the-books income source, the worker is counted exactly once in a total employment count. If the worker receives multiple official income sources, the worker may also be counted exactly once. In one or more embodiments of the invention, counting the worker exactly once helps provide a more accurate total count of employed workers in the employment metric. Thus, embodiments of the invention help avoid skewing the employment metric when workers have multiple income sources and/or off-the-books income sources.

In one or more embodiments of the invention, counting the worker exactly once is achieved using one or more of the aforementioned unique identifiers. Specifically, each income source for a worker may be associated with the same unique identifier (for example, the worker's social security number), thereby allowing all the worker's income sources to be considered as a whole, even if the income sources are reported from a mixture of business applications and personal financial management applications.

In general, embodiments of the invention allow for an employment metric to be generated based on aggregated employer payroll data and personal income data. Because the data are obtained from multiple data sources (e.g., both from the employer and employee) using automated processes, the data may be very timely and accurate. Thus, embodiments of the invention may help individuals, businesses, and government entities to make informed decisions based on the actual employment market. For example, in the event of a crisis (for example, an immediate crisis such as a natural disaster or terrorist attack, or a long-term crisis such as severe economic depression or recession), embodiments of the invention may provide timely and accurate information about how the employment market is responding to the crisis. Without timely and accurate information, the impact of the crisis on the employment market may be underestimated or overestimated. Further, embodiments of the invention, allow the employment metric to be generated and regenerated based on a variety of demographic criteria. Thus, embodiments of the invention allow for the employment metric to be tailored to the specific economic interests of individuals, businesses, and/or government entities.

Figure 5:
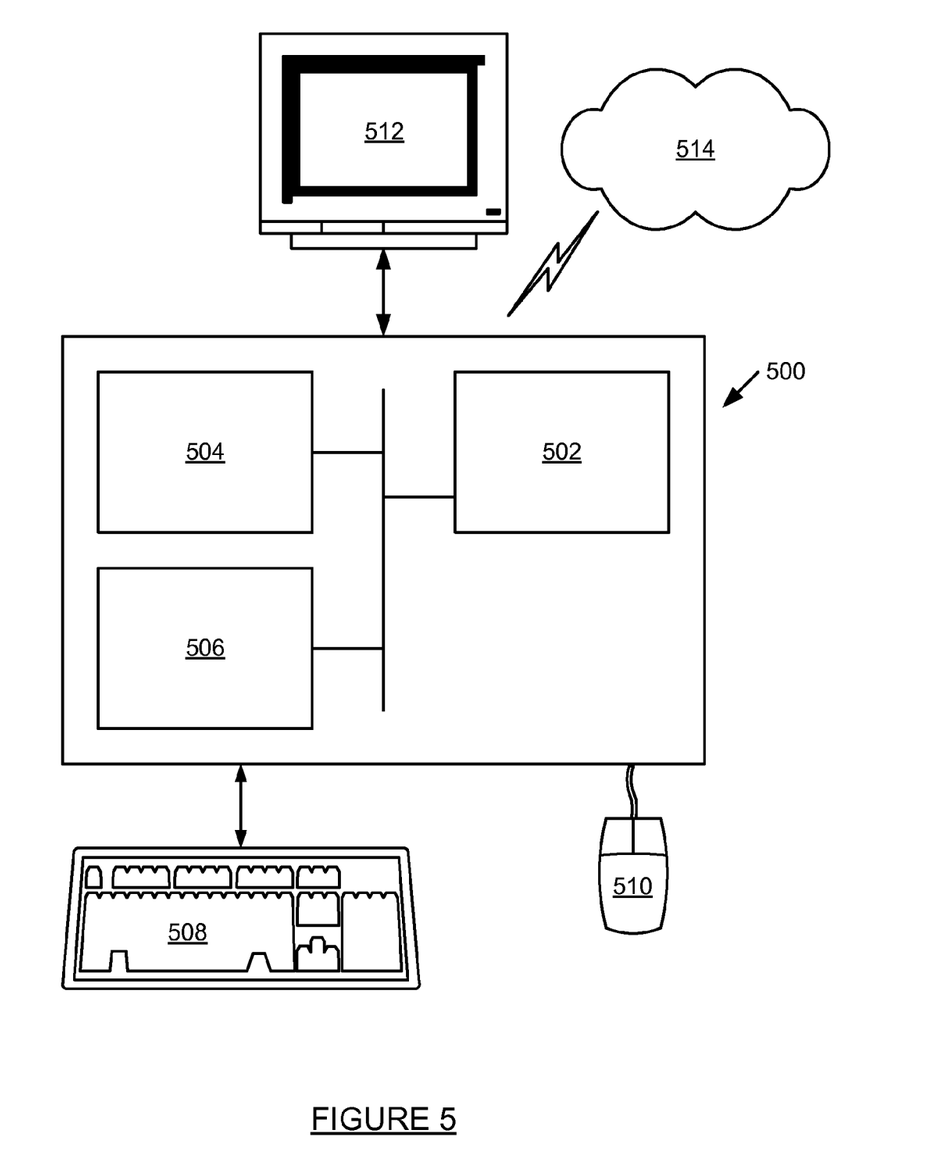
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (for example, a data processing service, authentication service, data filter, aggregate data repository, data source, business application, application data repository, data link service, staging data repository, data processing service, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for generating an employment metric comprising:
   obtaining, using a processor of a computer system, employer payroll data from a plurality of business applications configured to provide data relating to business operations;
   obtaining, using the processor, personal income data from a plurality of financial management applications used to track incomes and expenses of a plurality of individuals, wherein personal income data indicate at least one income source absent from employer payroll data;
   aggregating, using the processor, employer payroll data and personal income data to obtain aggregated employment data;
   obtaining, using the processor, demographic information of the plurality of individuals from the plurality of financial management applications;
   filtering, using the processor, aggregated employment data using a filtering criterion based on the demographic information; and
   generating, using the processor, the employment metric using the aggregated employment data,
   wherein the employment metric is specific to the filtering criterion.

2. The method of claim 1, wherein generating the employment metric comprises:
   analyzing aggregated employment data to identify an employment status of an individual, wherein the employment status includes the at least one income source absent from employer payroll data; and
   counting the individual exactly once in a total count of employed individuals.

3. The method of claim 2, wherein employer payroll data indicates that the individual is employed.

4. The method of claim 2, wherein employer payroll data indicates that the individual is unemployed.

5. The method of claim 2, wherein the at least one income source missing from employer payroll data generates unreported taxable income.

6. The method of claim 5, wherein unreported taxable income comprises income from selling products on a community website.

7. The method of claim 1, further comprising:
   wherein the filtering criterion is based on at least one selected from a group consisting of age, gender, location, occupation, and annual income, wherein the employment metric is specific to the demographic criterion.

8. The method of claim 1, further comprising:
   selling access to the employment metric.

9. A system for generating an employment metric comprising:
   an aggregate data repository configured to store aggregated employment data,
      wherein aggregated employment data comprises employer payroll data from a plurality of business applications configured to provide data relating to business operations,
      wherein aggregated employment data further comprises personal income data from a plurality of financial management applications used to track incomes and expenses of a plurality of individuals, and
      wherein personal income data indicate at least one income source absent from employer payroll data; and
   a processor operatively connected to the aggregate data repository and memory storing instructions when executed by the processor comprising functionalities to:
      obtain demographic information of the plurality of individuals from the plurality of financial management applications;
      filter aggregated employment data using a filtering criterion based on the demographic information; and
      generate the employment metric using the aggregated employment data,
      wherein the employment metric is specific to the filtering criterion.

10. The system of claim 9, wherein the processor is further configured to generate the employment metric by:
   analyzing aggregated employment data to identify an employment status of an individual, wherein the employment status includes the at least one income source absent from employer payroll data; and counting the individual exactly once in a total count of employed individuals.

11. The system of claim 10, wherein employer payroll data indicates that the individual is employed.

12. The system of claim 10, wherein employer payroll data indicates that the individual is unemployed.

13. The system of claim 10, wherein the at least one income source missing from employer payroll data generates unreported taxable income.

14. The system of claim 13, wherein unreported taxable income comprises income from selling products on a community website.

15. The system of claim 9, wherein the filtering criterion is based on at least one selected from a group consisting of age, gender, location, occupation, and annual income.

16. The system of claim 9, wherein the data processing service is further configured to:
 generate a report comprising the employment metric; and
 grant access to the report for an entity that has purchased access to the report.

17. A computer readable medium comprising instructions for generating an employment metric, wherein the instructions executed by a computer processor comprise functionality to:
 obtain employer payroll data from a plurality of business applications configured to provide data relating to business operations;
 obtain personal income data from a plurality of financial management applications used to track incomes and expenses of a plurality of individuals, wherein personal income data indicate at least one income source absent from employer payroll data;
 aggregate employer payroll data and personal income data to obtain aggregated employment data;
 obtain demographic information of the plurality of individuals from the plurality of financial management applications;
 filter aggregated employment data using a filtering criterion based on the demographic information; and
 generate the employment metric using aggregated employment data,
 wherein the employment metric is specific to the filtering criterion.

18. The computer readable medium of claim 17, wherein instructions to generate the employment metric comprise instructions to:
 analyze aggregated employment data to identify an employment status of an individual, wherein the employment status includes the at least one income source absent from employer payroll data; and
 count the individual exactly once in a total count of employed individuals.

19. The computer readable medium of claim 18, wherein employer payroll data indicates that the individual is employed.

20. The computer readable medium of claim 18, wherein employer payroll data indicates that the individual is unemployed.

21. The computer readable medium of claim 18, wherein the at least one income source missing from employer payroll data generates unreported taxable income.

22. The computer readable medium of claim 21, wherein unreported taxable income comprises income from selling products on a community website.

23. The computer readable medium of claim 17, wherein the filtering criterion is based on at least one selected from a group consisting of age, gender, location, occupation, and annual income.

24. The computer readable medium of claim 17, wherein executable instructions further comprise instructions to sell access to the employment metric.

* * * * *

UNITED STATES PATENT AND TRADEMARK OFFICE
CERTIFICATE OF CORRECTION

PATENT NO. : 7,809,622 B1 Page 1 of 1
APPLICATION NO. : 12/060060
DATED : October 5, 2010
INVENTOR(S) : Todd Matthew Fitch et al.

It is certified that error appears in the above-identified patent and that said Letters Patent is hereby corrected as shown below:

In Claim 7, Column 12 (lines 29-31), "wherein the employment metric is specific to the demographic criterion" should be deleted.

Signed and Sealed this

Twenty-third Day of November, 2010

David J. Kappos
*Director of the United States Patent and Trademark Office*